Apr. 24, 1923.
G. LYESO
1,452,564
SLICING MACHINE
Filed Oct. 25, 1922
4 Sheets-Sheet 2
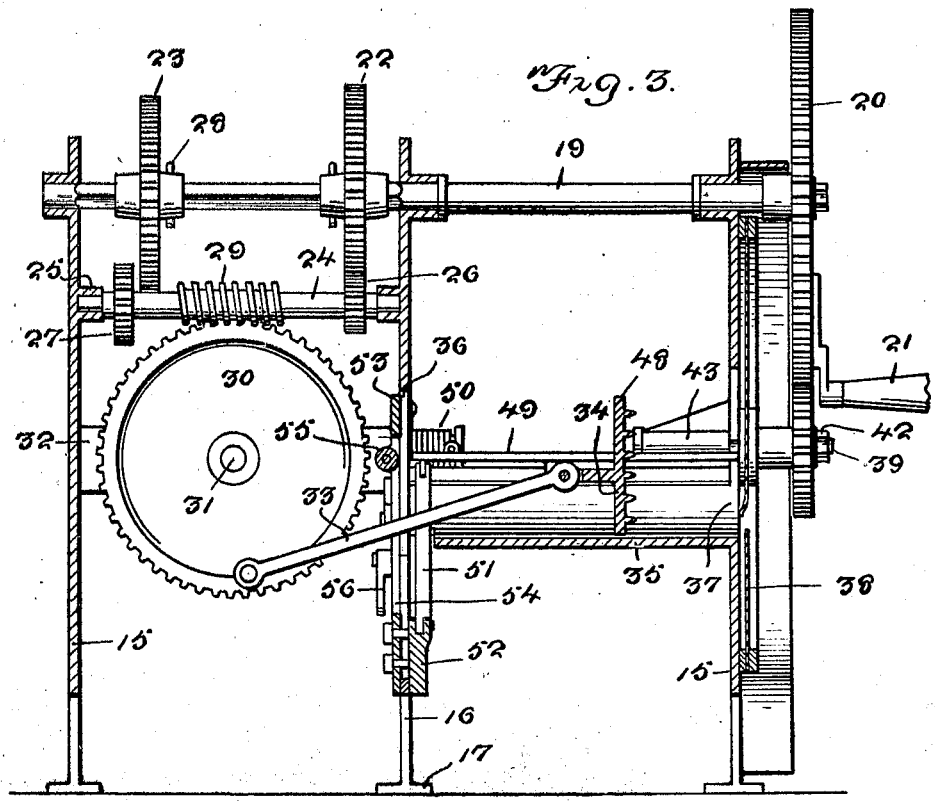
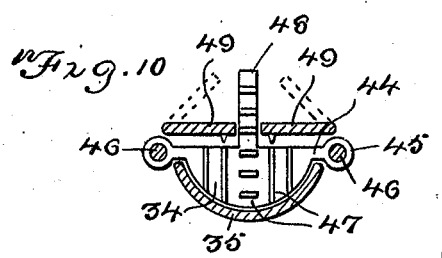
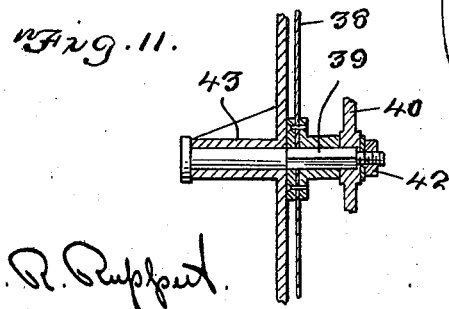
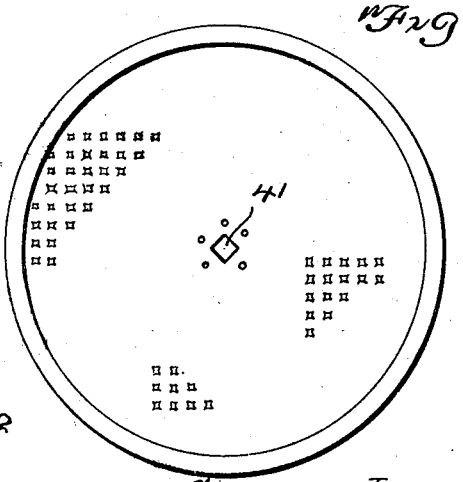
George Lyeso
INVENTOR
BY Victor J. Evans
ATTORNEY
WITNESS:

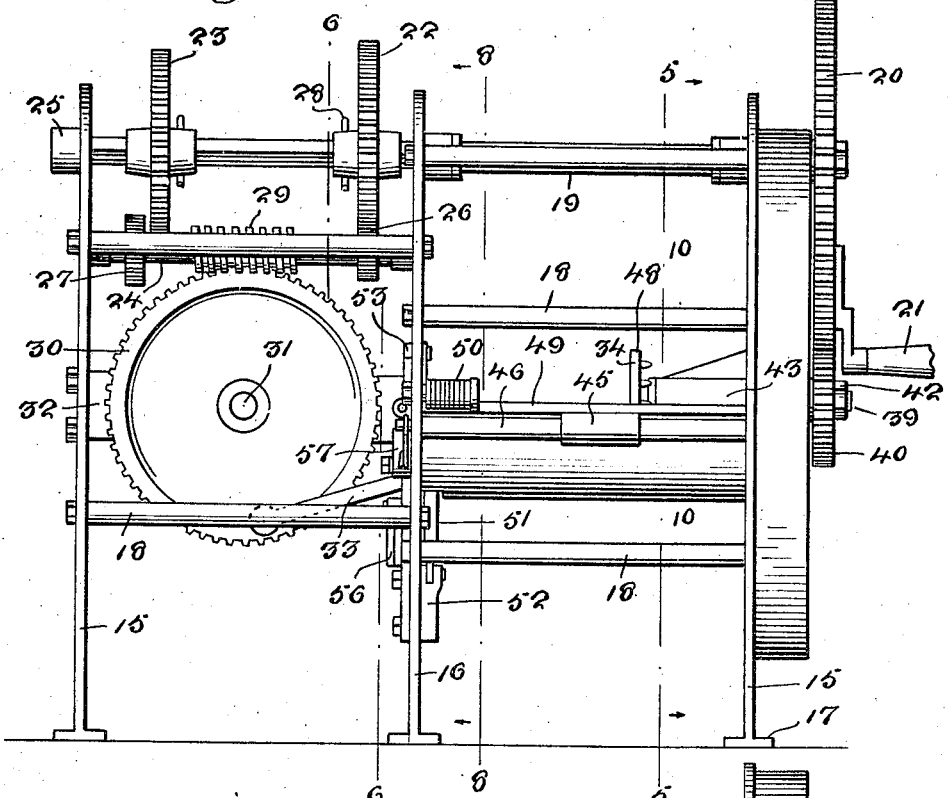
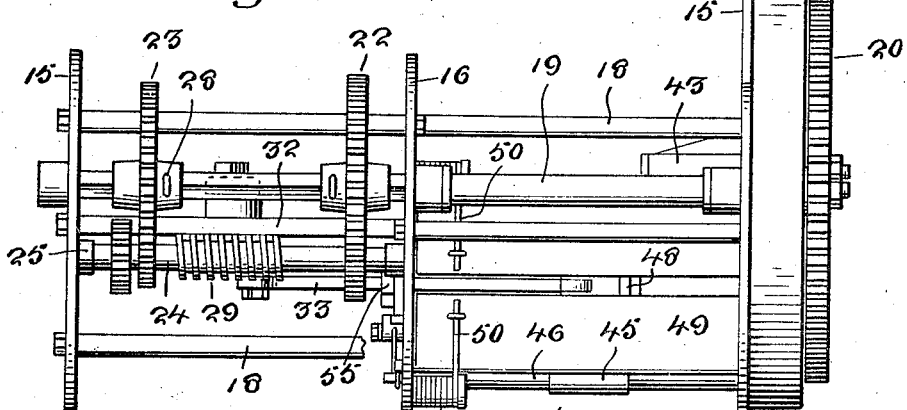

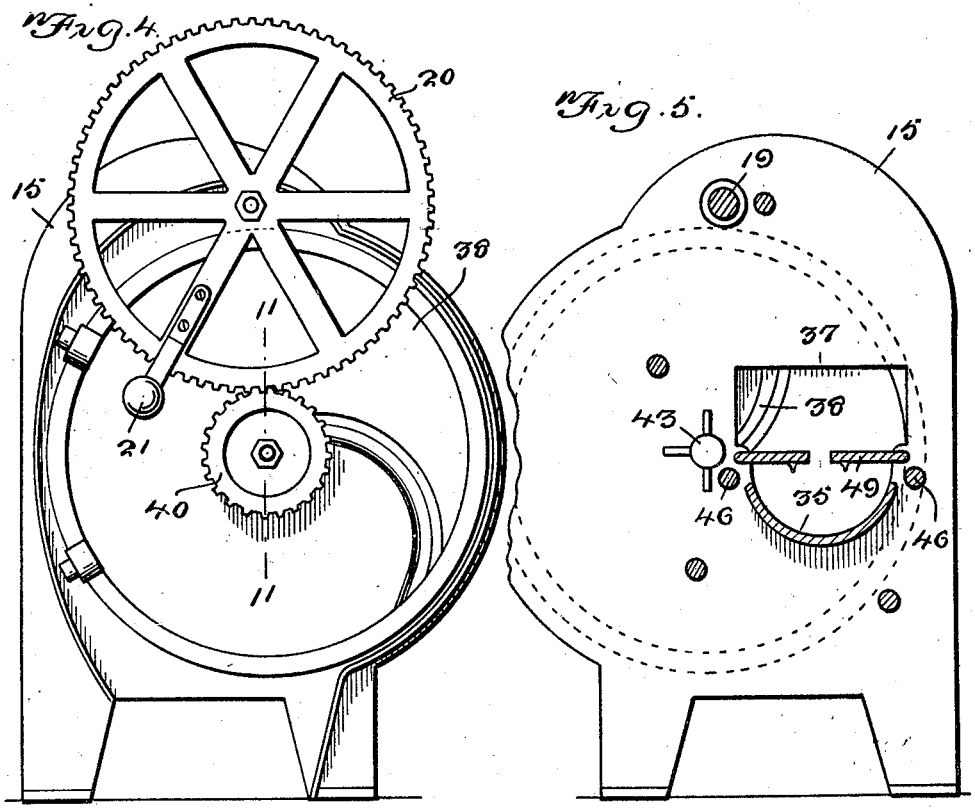
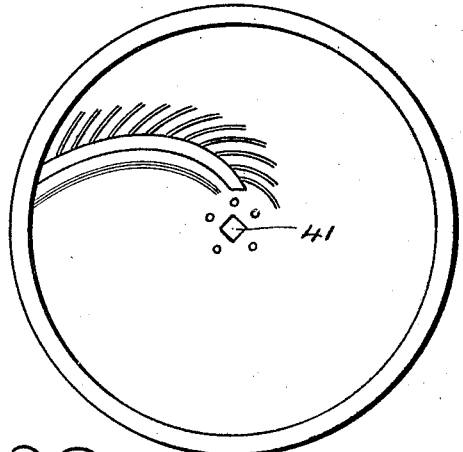
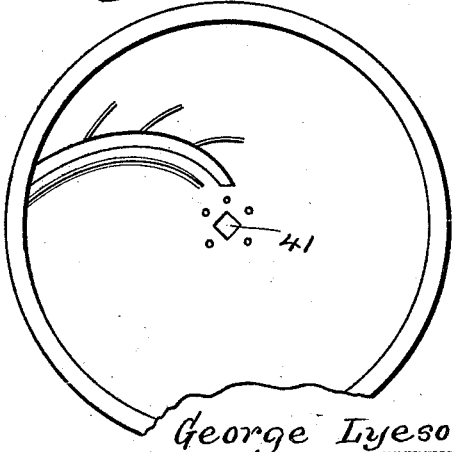

Apr. 24, 1923.

G. LYESO

SLICING MACHINE

Filed Oct. 25, 1922

George Lyeso
INVENTOR

BY Victor J. Evans
ATTORNEY

WITNESS:

Patented Apr. 24, 1923.

1,452,564

UNITED STATES PATENT OFFICE.

GEORGE LYESO, OF SIMPSON, WEST VIRGINIA, ASSIGNOR OF ONE-HALF TO GEORGE HRIB, OF SIMPSON, WEST VIRGINIA.

SLICING MACHINE.

Application filed October 25, 1922. Serial No. 596,807.

*To all whom it may concern:*

Be it known that I, GEORGE LYESO, a citizen of Czechoslovakia, residing at Simpson, in the county of Taylor and State of West Virginia, have invented new and useful Improvements in Slicing Machines, of which the following is a specification.

This invention relates to machines especially designed for cutting vegetables and has for an object the provision of a machine wherein the cutting blades or knives are interchangeable for use with different vegetables and to provide for different cuts.

Another object of the invention is the provision of a cutting machine wherein novel means, including a feed trough, is provided for feeding the vegetables to the cutters, means being provided for automatically closing the trough at the beginning of the feeding operation and for automatically opening the trough at the end of an operation to permit of the insertion of the vegetables.

With the above and other objects in view, the invention further includes the following novel features and details of construction, to be hereinafter more fully described, illustrated in the accompanying drawings and pointed out in the appended claims.

In the drawings:—

Figure 1 is a side elevation of a machine constructed in accordance with the invention.

Figure 2 is a top plan view of the same.

Figure 3 is a longitudinal sectional view.

Figure 4 is an end view.

Figure 5 is a section on the line 5—5 of Figure 1.

Figure 10 is a fragmentary section on the line 10—10 of Figure 1.

Figure 11 is a section on the line 11—11 of Figure 4.

Figures 12, 13 and 14 are elevations showing different forms of cutters.

Figure 6:
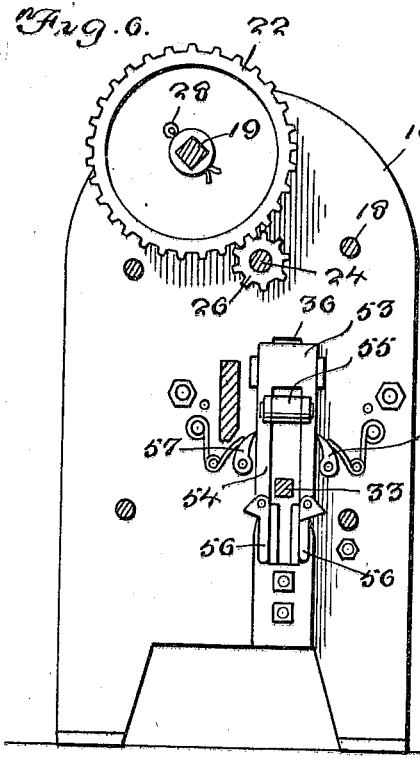
Figure 6 is a similar view on the line 6—6 of Figure 1, showing the position of the parts when the feed trough is closed.

Referring in detail to the drawings, wherein like characters of reference denote corresponding parts, the invention comprises a frame which includes spaced end standards 15 and an intermediate standard 16, each of which is provided with flanges or feet 17 to insure a firm support or provide for permanently securing the machine in position. The standards 15 and 16 are connected by spacing bolts or rods 18, while extending through and having bearings within the standards is a driving shaft 19. Any suitable means may be employed for operating the driving shaft, the means shown consisting of a gear wheel 20 having an operating handle 21 secured thereto.

The shaft 19 has secured thereon in a manner to permit of longitudinal movement, gears 22 and 23, which are adapted to operate a countershaft 24 which is mounted in bearings 25 carried by the standards 15 and 16. The shaft 24 has secured thereon pinions 26 and 27 which are of different diameters, the pinion 26 being adapted to engage the gear 22 to rotate the shaft 24 at one speed and the pinion 27 to engage the gear 23 to provide a different speed for said shaft. The pinions 22 and 23 are slidable upon the shaft 19 and are held in position by any suitable means. For example, pins 28 will be provided which extend through the hubs of the gears and through the shaft 19.

The shaft 24 carries a worm 29 and this worm engages a gear 30 which is mounted upon a stub shaft 31, the latter rotating in a suitable bearing provided in a bracket 32 which connects one of the standards 15 and the standard 16. The gear 30 has pivotally secured thereto one end of a pitman 33 and the opposite end of this pitman is pivotally connected to a feeding member 34 which operates in a feed trough 35. The feed trough 35 connects the standard 16 and one of the standards 15 and the former standard is provided with a slot 36 through which the pitman 33 operates. The trough 35 is adapted to contain the vegetable or other article to be cut and the standard 15 at the end of the trough is provided with an opening 37 through which said article projects, whereby the same may be acted upon by a cutter 38. This cutter is mounted upon a stub shaft 39 which extends from one of the standards 15 and has secured thereon a pinion 40 which is engaged by the gear 20 for the purpose of rotating the cutter.

In Figures 12, 13 and 14, different forms of cutters are shown, the one shown in Figure 11 being adapted to cut potatoes into elongated or stringy form, while the one shown in Figure 13 is adapted to cut them in the form used for French frying, while the cutter 14 is in the form of a grater. The cutter which is shown attached to the machine is in the form of a slicer. Each of these cutters is provided with a rectangular opening 41 which engages a similar shaped portion on the shaft 39, as does also the pinion 40 and this pinion and the cutter is held in proper position by means of a nut 42. The shaft 39 is capable of longitudinal sliding movement in its bearing 43 and by removing the nut and the pinion 40, the shaft may be moved inward a sufficient distance to permit of the removal of the cutter and the substitution of another cutter.

Figure 8:
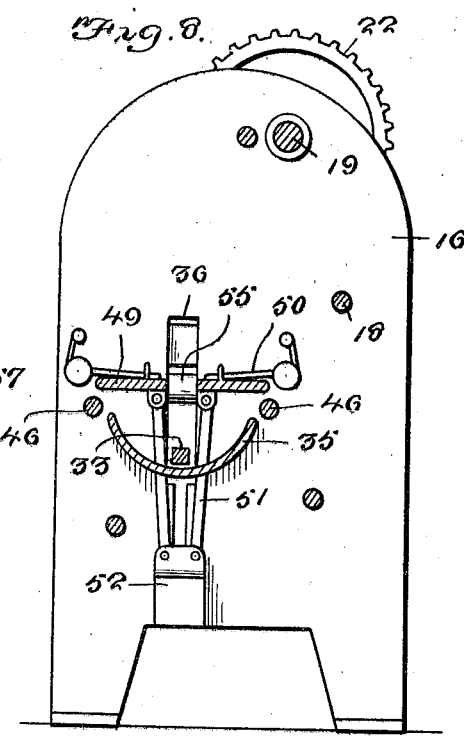
Figure 8 is a section on the line 8—8 of Figure 1, with the parts in the position shown in Figure 6.
Figure 9:
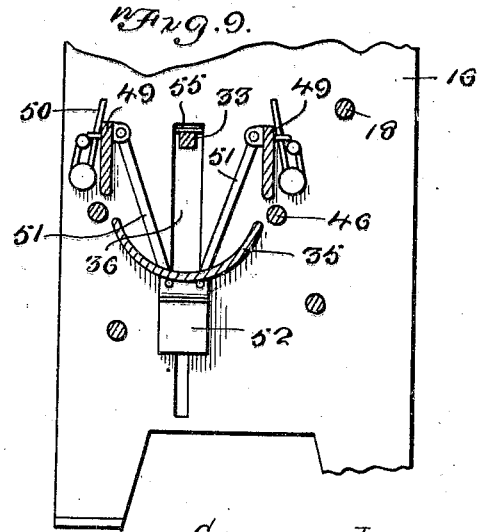
Figure 9 is a view similar to Figure 8, partly broken away with the parts in the position shown in Figure 7.

The feed trough 35 is semi-circularly shaped in cross section as shown in Figures 8 and 9 of the drawings and the feeding member 34 which operates within this trough is similarly shaped and extends upwardly beyond the top of the trough and is provided with oppositely and outwardly extending arms 44 which carry sleeves 45. These sleeves receive rods 46 which are located upon opposite sides of the trough and which are supported by the standard 16 and one of the standards 15, and as the sleeves are slidable upon these rods a cross head is provided which is movable longitudinally of the trough for the purpose of feeding the vegetable to the cutter. The feeding member 34 is provided with vertically and transversely arranged ribs 47 which act to retain the vegetable at the bottom of the trough during its movement toward the cutter. The feeding member is further provided with a centrally arranged vertically disposed arm 48.

Figure 7:
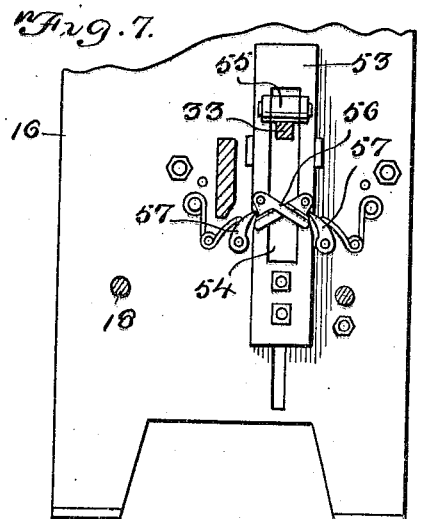
Figure 7 is a similar view partly broken away showing the position of the parts when the feed trough is open.

Pivotally mounted between one of the standards 15 and the standard 16 upon opposite sides of the trough 35 is a cover member or closure 49, the latter being normally closed under the action of springs 50. Each of the closure members 49 has pivotally connected thereto the upper end of a rod 51, whose lower end is pivotally connected to a block 52 which is carried by a slot 53. This slide is vertically movable over the slide 36 of the standard 16 and is guided upon said standard, being slotted as shown at 54 to permit of the operation of the pitman 33 therethrough. The slide 53 is provided with a transversely arranged roller 55 and this roller is adapted to be engaged by the pitman 33 when the feeding member 34 reaches the limit of its outward movement, or the end of the feeding stroke. The slide 53 will thus be elevated and will, through the medium of the rods 51 raise the closures 49 against the action of their springs. The slide 53 carries pivotally mounted dogs 56 and when the closures reach their open position, these dogs 56 are engaged by spring actuated dogs 57 which are pivotally mounted upon the standard 16. The dogs 56 will thus be held in the position shown in Figure 7 of the drawings until the feeding member 34 reaches the limit of its reverse movement, or the beginning of the feeding stroke, whereupon the pitman 33 will engage the dogs 56 to move them pivotally and release them from the dogs 57, so that the closures will move to a closed position under the action of the springs 50 and will carry with them the slide 53. The closures thus act to retain the vegetable within the trough and should the said vegetable be of a size to extend above the top of the trough, the closures will occupy substantially the position shown by the dotted lines in Figure 10 during the feeding operation, but will be automatically opened by the release of the dogs 57 at the beginning of the feeding stroke so as to permit of the insertion of the vegetable.

The invention is susceptible of various changes in its form, proportions and minor details of construction and the right is herein reserved to make such changes as properly fall within the scope of the appended claims.

Having described the invention what is claimed is:—

1. A vegetable cutting machine embodying a frame, a horizontally disposed feed trough, a cutter at one end of the trough, a feeding member movable longitudinally of the trough, means for operating the cutter, means including a pitman for operating the feeding member, a closure for the top of the trough and means including a pitman operated slide having a slot therethrough for the passage of the pitman and operatively connected to the feeding member, whereby the closure will be automatically closed at the beginning of the feeding movement and automatically opened at the end of said movement.

2. A vegetable cutting machine embodying a frame, a horizontally disposed feed trough, a cutter at one end of the trough, a feeding member movable longitudinally of the trough, means including a pitman for operating the feeding member, a spring actuated closure for the top of the trough and means controlled by the pitman for operating the closure to open the trough at the end of each feeding operation.

3. A vegetable cutting machine embodying a frame, a horizontally disposed feed trough, a cutter at one end of the trough, a feeding member movable longitudinally of the trough, means for operating the cutter, means for operating the feeding member, a closure for the top of the trough and means including a vertically movable slide located adjacent and connected to one end of the closure for opening the latter at the end of each feeding operation.

4. A vegetable cutting machine embodying a frame, a feed trough, a cutter at one end of the trough, a feeding member movable longitudinally of the trough, means for operating the cutter, means including a pitman for operating the feeding member, a spring actuated closure for the trough, means for opening said closure at the end of the feeding operation, means for holding the closure in open position and means whereby the pitman will release the holding means at the beginning of the feeding operation.

5. A vegetable cutting machine embodying a frame, a feed trough, a cutter at one end of the trough, a feeding member movable longitudinally of the trough, means for operating the cutter, means for operating the feeding member, a spring actuated closure for the trough and a slide connected to the closure, means included in the feeding member operating means for operating a slide at the end of the feeding operation to open the closure, spring actuated means for holding the slide in position and means for operating the spring actuated holding means to release the slide at the beginning of the feeding operation.

In testimony whereof I affix my signature.

GEORGE LYESO.